(12) United States Patent
Walsh et al.

(10) Patent No.: US 9,328,851 B2
(45) Date of Patent: May 3, 2016

(54) APPARATUS FOR SECURING COMPONENTS TO SUBSTRATES

(75) Inventors: Stephen Walsh, Portland, ME (US); Geoff Herguth, Portland, ME (US)

(73) Assignee: Klipstik LLC, Portland, ME (US)

( * ) Notice: Subject to any disclaimer, the term of this patent is extended or adjusted under 35 U.S.C. 154(b) by 1 day.

(21) Appl. No.: 14/124,736

(22) PCT Filed: Jun. 7, 2012

(86) PCT No.: PCT/US2012/041265
§ 371 (c)(1),
(2), (4) Date: Dec. 9, 2013

(87) PCT Pub. No.: WO2012/170638
PCT Pub. Date: Dec. 13, 2012

(65) Prior Publication Data
US 2014/0097314 A1    Apr. 10, 2014

Related U.S. Application Data

(60) Provisional application No. 61/495,535, filed on Jun. 10, 2011.

(51) Int. Cl.
| | |
|---|---|
| *F16L 3/22* | (2006.01) |
| *H02G 3/30* | (2006.01) |
| *H02G 3/32* | (2006.01) |
| *F16L 3/06* | (2006.01) |
| *F16L 3/223* | (2006.01) |
| *F16L 3/227* | (2006.01) |
| *F16L 3/04* | (2006.01) |

(52) U.S. Cl.
CPC ... *F16L 3/06* (2013.01); *F16L 3/04* (2013.01); *F16L 3/223* (2013.01); *F16L 3/227* (2013.01); *H02G 3/305* (2013.01); *H02G 3/32* (2013.01)

(58) Field of Classification Search
CPC .......... H02G 3/32; H02G 3/305; F16L 3/137; F16L 3/223; F16L 3/227
USPC ............... 248/68.1, 74.1, 74.2, 74.3; 174/135
See application file for complete search history.

(56) References Cited

U.S. PATENT DOCUMENTS

| | | | | |
|---|---|---|---|---|
| 2,397,291 A | * | 3/1946 | Robertson | F16L 3/223 |
| | | | | 211/120 |
| 3,132,831 A | * | 5/1964 | Stamper | H03F 3/72 |
| | | | | 248/68.1 |
| 3,363,864 A | * | 1/1968 | Olgreen | F16L 3/04 |
| | | | | 248/68.1 |
| 3,913,876 A | * | 10/1975 | McSherry | H02G 3/32 |
| | | | | 24/484 |
| 4,005,942 A | * | 2/1977 | Gilb | E04B 1/2612 |
| | | | | 248/903 |
| 5,027,960 A | * | 7/1991 | Rainville | A47F 5/08 |
| | | | | 211/118 |

(Continued)

*Primary Examiner* — Ryan Kwiecinski
(74) *Attorney, Agent, or Firm* — Caseiro Burke LLC; Chris A. Caseiro

(57) ABSTRACT

An apparatus for securing a component to a substrate. The apparatus includes a backing and a retainer interface. The backing includes a bonding element on a first surface and the retainer interface on an opposing second surface. The first surface of the backing is applied to a substrate to which a component is to be secured. The component is secured on the second surface of the backing so that the backing is positioned between the substrate and the component to be secured. The backing may be rigid or flexible. The first surface of the backing tape includes an adhesive as the bonding element. The backing tape may also include a removable paper interface to enable the installer to move the backing tape into a desired location before removing the paper to expose the adhesive for its attachment to the substrate.

7 Claims, 4 Drawing Sheets

(56) References Cited

U.S. PATENT DOCUMENTS

| | | | | |
|---|---|---|---|---|
| 5,743,497 A * | 4/1998 | Michael | F16L 3/223 | 248/316.7 |
| 6,105,908 A * | 8/2000 | Kraus | F16L 3/137 | 24/16 PB |
| 6,149,109 A * | 11/2000 | Stankowski | F16L 3/2334 | 24/16 PB |
| 6,196,751 B1 * | 3/2001 | Khokhar | F16D 1/08 | 24/16 PB |
| 6,375,129 B2 * | 4/2002 | Koziol | H02G 3/26 | 174/662 |
| 7,392,967 B2 * | 7/2008 | Liaw | F16M 13/02 | 248/188.1 |
| 8,134,075 B1 * | 3/2012 | Vail | H02G 3/14 | 174/135 |
| 8,558,112 B2 * | 10/2013 | Pawluk | H02G 3/0437 | 174/68.1 |
| 9,059,575 B2 * | 6/2015 | Pawluk | H02G 3/0437 | |
| 9,222,603 B2 * | 12/2015 | Rego | F16L 3/221 | |
| 2006/0113432 A1 * | 6/2006 | Driskell | A61M 39/08 | 248/68.1 |
| 2006/0169482 A1 * | 8/2006 | Hess | H02G 3/305 | 174/135 |
| 2006/0186278 A1 * | 8/2006 | Tjerrild | F16L 3/133 | 248/65 |
| 2007/0009220 A1 * | 1/2007 | Jadaud | H02G 3/32 | 385/135 |
| 2009/0072098 A1 * | 3/2009 | Smallhorn | H02G 3/32 | 248/68.1 |
| 2011/0108699 A1 * | 5/2011 | Komaro | F16L 3/127 | 248/636 |
| 2012/0049011 A1 * | 3/2012 | Liu | H02G 3/32 | 248/68.1 |
| 2012/0145837 A1 * | 6/2012 | Li | H02G 3/32 | 248/74.2 |
| 2014/0021309 A1 * | 1/2014 | Rouleau | H02G 3/32 | 248/69 |
| 2014/0082923 A1 * | 3/2014 | Owen | B65D 63/1081 | 29/525.03 |
| 2014/0153187 A1 * | 6/2014 | Liu | H02G 3/32 | 361/679.58 |
| 2014/0299719 A1 * | 10/2014 | Wolff | F16L 3/221 | 248/71 |

* cited by examiner

APPARATUS FOR SECURING COMPONENTS TO SUBSTRATES

BACKGROUND OF THE INVENTION

1. Field of the Invention

The present invention relates to devices for securing components to substrates. In particular, the present invention relates to devices for locating a component on a substrate where desired in an efficient manner. More particularly, the present invention is related to devices for securing electrical wires and cables to studs.

2. Description of the Prior Art

In the field of electrical wiring of building structures, it is necessary to secure the wiring, which includes cables containing wires, in a particular location on a substrate and in a manner that reduces the possibility of the wire insulation being compromised in the course of the installation. Further, the wiring must be secured at regular intervals on the substrate. In most instances, the substrate is a building stud. That stud can be made of wood or metal. In general, electrical wiring is secured to wood using securing devices such as nails, straps and staples, for example, and to metal using some form of metal clip with mechanical fasteners, for example.

The National Electrical Code (NEC) requires the installer to secure the wire on the side of the stud a certain distance away from the edge of the stud face so that there is a reduced likelihood that the wire sheath will be pierced by drywall screws when drywall is installed. In addition, those ordinances often require the installer to secure the wiring on the side of the stud at regular intervals, maximum spacing, not more than 4 feet, 6 inch spacing intervals, not more than six inches from a ceiling or floor and not more than six inches from a junction box. Other spacing requirements may also be applicable. These requirements, while important for safety, lead to a time-consuming process of securing electrical wiring to substrates. That is, the installer must ensure that the wiring is properly aligned with respect to the edge of the stud face—over wiring runs that can stretch for many yards—and the installer must go through the repetitive process of applying the securing devices at many places over those wiring runs. Any building of significant size requires a substantial amount of manpower to complete all required wiring in a proper manner. It is desirable to have a more efficient, but at least as effective, mechanism for building wiring.

The wiring installation process briefly described above has been suitable for the placement of the wiring where it is suppose to be located. The securing devices used to complete that placement are nails, staples, screws and spikes that are very sharp so as to penetrate into the stud. However, they are also sharp enough and placed with such force that they can easily penetrate the wire sheath, which can damage the wiring to varying degrees ranging from severing the wire to removal of the sheath to expose the wire itself. Either form of sheath compromise is undesirable. In the course of wiring an entire building, such compromise may occur more than once, it may not be visible upon cursory inspection and may not be detectable in initial power testing. If detected through electrical testing, it may be difficult to identify the source of the failure. Hours of inspection can be the result in that instance, with many man-hours spent attempting to solve the problem. Moreover, the compromise may not be detected until long after testing has been completed to satisfaction, when a serious problem occurs in the building including, but not limited to a fire event. It is desirable to have a mechanism for securing wiring to a substrate that eliminates the possibility of compromising the wire sheath during the wiring installation process.

Of course, it is the goal of all electricians to install wiring properly and without compromising the wire sheath. This can be a difficult goal to accomplish given the large number of securing sites required and the locations of the securing sites. For example, it is not uncommon for securing substrates such as building studs to be located in difficult places to reach and with little room to maneuver the tools needed to place the securing devices. As a result, the wiring installation may be less than perfect, or less suitable means for securing the wiring may be employed to accommodate the inconvenient location. This may be less of an issue in new building structures, but it is more of a concern in building renovations where wiring upgrades must conform to older substrate configurations. It is desirable to have a securing mechanism that can be used in virtually any location with minimal space required to effect the securing of the wiring to the substrate.

What is needed is an apparatus for securing electrical wiring to building studs. More generally, what is needed is an apparatus for securing components to substrates.

SUMMARY OF THE INVENTION

It is an object of the present invention to provide an apparatus for securing electrical wiring to building studs. It is also an object of the present invention to provide an apparatus for securing a component to a substrate that can be easily and quickly applied to the substrate and that reliably secures the component to the substrate.

These and other objects are achieved with the present invention, which is an apparatus for securing a component to a substrate. The apparatus includes a backing and a retainer interface. The backing includes a bonding element on a first surface and the retainer interface on an opposing second surface. The first surface of the backing is applied to a substrate to which a component is to be secured. The component is secured on the second surface of the backing so that the backing is positioned between the substrate and the component to be secured.

The backing may be rigid or flexible. In one embodiment of the invention, the backing is a flexible reinforced electrical tape of selectable width. For example, the tape backing may be about as wide as a building stud but not limited thereto; that is, it may be wider or narrower. The first surface of the backing tape includes an adhesive as the bonding element. The backing tape may also include a removable paper interface to enable the installer to move the backing tape into a desired location before removing the paper to expose the adhesive for its attachment to the substrate.

The retainer interface is aligned with the long axis of the backing. It is joined to the backing with joining means that provides a plurality of sites for introduction of a retainer. In one embodiment of the invention, the retainer interface is a strip of fabric or plastic and the joining means is stitching that passes through the retainer interface and the backing such as may be achieved in a sewing process. The joining means may also be stapling, clamping or adhesive that is not continuously placed between the backing and the retainer interface. The retainer interface in fabric or plastic form may be reinforced.

The retainer interface may be of selectable width. In one embodiment of the invention, it is narrower than the backing. It may be centered or offset on the backing. In one embodiment of the invention, the retainer interface is located on the backing so that when an edge of the backing is aligned with the edge of the substrate to which it is applied, the retainer interface is spaced away from the edge of the substrate a distance that corresponds with the required spacing of electrical wiring from the edge of a stud. That is, if the wiring must be 1.25-inches from the edge of the stud, the retainer interface is joined to the backing so that it is located 1.25-inches from an edge of the backing. The retainer interface may be placed at other locations along the length of the backing.

The retainer interface is configured with regular, periodic, sporadic or intermittent joining to the backing so that there are regular, periodic, sporadic or intermittent separations or gaps between the retainer interface and the backing at the interface thereof. It is at these separations that a retainer device may be used to secure a component to the securing apparatus that is the present invention. The retainer may be a tie wrap, a twist tie, a string, roping or other form of non-invasive device suitable for permanently or removably joining one item to another.

In the embodiment of the invention suitable for securing wiring to a stud, the wiring may be placed on the retainer interface along its length for a selectable distance. A plurality of tie wraps are then inserted into the gaps located between the backing and the retainer interface at selectable intervals. The tie wraps are then wrapped about the wiring and the clamping end of the tie wraps thereof engaged with the body end thereof and snugged down so that the wiring is tied to the retainer interface, which is, in turn, secured to the backing that is joined to the stud. The tie placement intervals may be selected as a function of local wiring requirements. The ties may be engaged serially, intermittently or in parallel by one or more installers.

It is to be noted that the tie wraps or such other suitable retainer may be partially engaged so that one or more of the retainers is formed as a loop having an inside dimension greater than the outside dimension of the wiring. The wiring may be passed through the formed loops in a way that allows the installer to run the wiring a desired length while maintaining it in a desired position, including on a vertical surface. That is, the loops prevent the wiring from moving off the securing apparatus while also allowing the wiring to move freely along the length of the retainer interface. Once the wiring is positioned where desired, the tie wraps maybe fully engaged to capture the wiring and prevent its movement in any direction.

It is also to be noted that it is not necessary to apply the securing apparatus along the entire length of the stud. Instead, it can be applied at periodic, sporadic or intermittent locations along the length of the stud. For example, a plurality of securing apparatuses may be spaced from one another by spacing in a discontinuous arrangement. Alternatively, a single continuous length of the securing apparatus may be employed.

It is to be further noted that the securing apparatus of the present invention may be used to secure a plurality of wires together on a stud. It is not uncommon to have a plurality of wiring cables run in parallel along a stud. Through regulation of the size of the loop formed with the tie wraps as described above, a plurality of wiring cables may be run and retained in the loops. When the installer is ready, the tie wraps may be fully engaged so as to secure the plurality of wiring cables together in a location of interest and without any invasive retaining element used.

Yet further, it is to be noted that a plurality of retainer interfaces may be joined to the backing and run in parallel with one another. For example, two or more retainer interfaces may be spaced from one another on the backing. They may be used to run a plurality of wiring cables on a stud so that they are not in contact with one another. Alternatively, each of the plurality of retainer interfaces may be used to secure a plurality of wiring cables together and in parallel with one or more other wiring cables.

The present invention ensures that wiring is positioned where intended and without the use of any sort of device capable of penetrating the wire sheath. The securing apparatus of this configuration may be used in confined spaces. It can be applied quickly and without the need of nails, staples, clamps and the like, and the tools necessary to secure such items to the stud. Moreover, the tie wraps can be removed much more readily than nails, staples or clamps if there is an interest in removing the wiring for any reason.

The securing apparatus of the present invention is suitable and effective as a device for wiring a building in an efficient and safe manner that eliminates the possibility of exposing metal wires. However, it is to be understood that the securing apparatus has a wide range of applications where it is desirable to establish an arrangement for effective joining of a component to a substrate, including in those locations where there is a desire to avoid inserting something, such as a nail or a screw, for example, into the substrate. One use may be that of an apparatus to hang a picture or an advertisement on a wall. The securing apparatus may be applied to the wall, a retainer such as a hook may be inserted in a gap of the retainer interface and the picture or advertisement hanged on the hook. Another use may be that of an apparatus to secure tubing, such as plumbing tubing, to a structure. The securing apparatus may be applied to the structure, the tubing placed on the retainer interface and tie wraps inserted into the gaps of the retainer interface and secured about the tubing. The tie wraps could easily be cut if there were a desire to relocate the tubing.

These and other advantages of the present invention will become more apparent upon review of the following detailed description and the accompanying drawings.

DETAILED DESCRIPTION OF THE INVENTION

Figure 1:
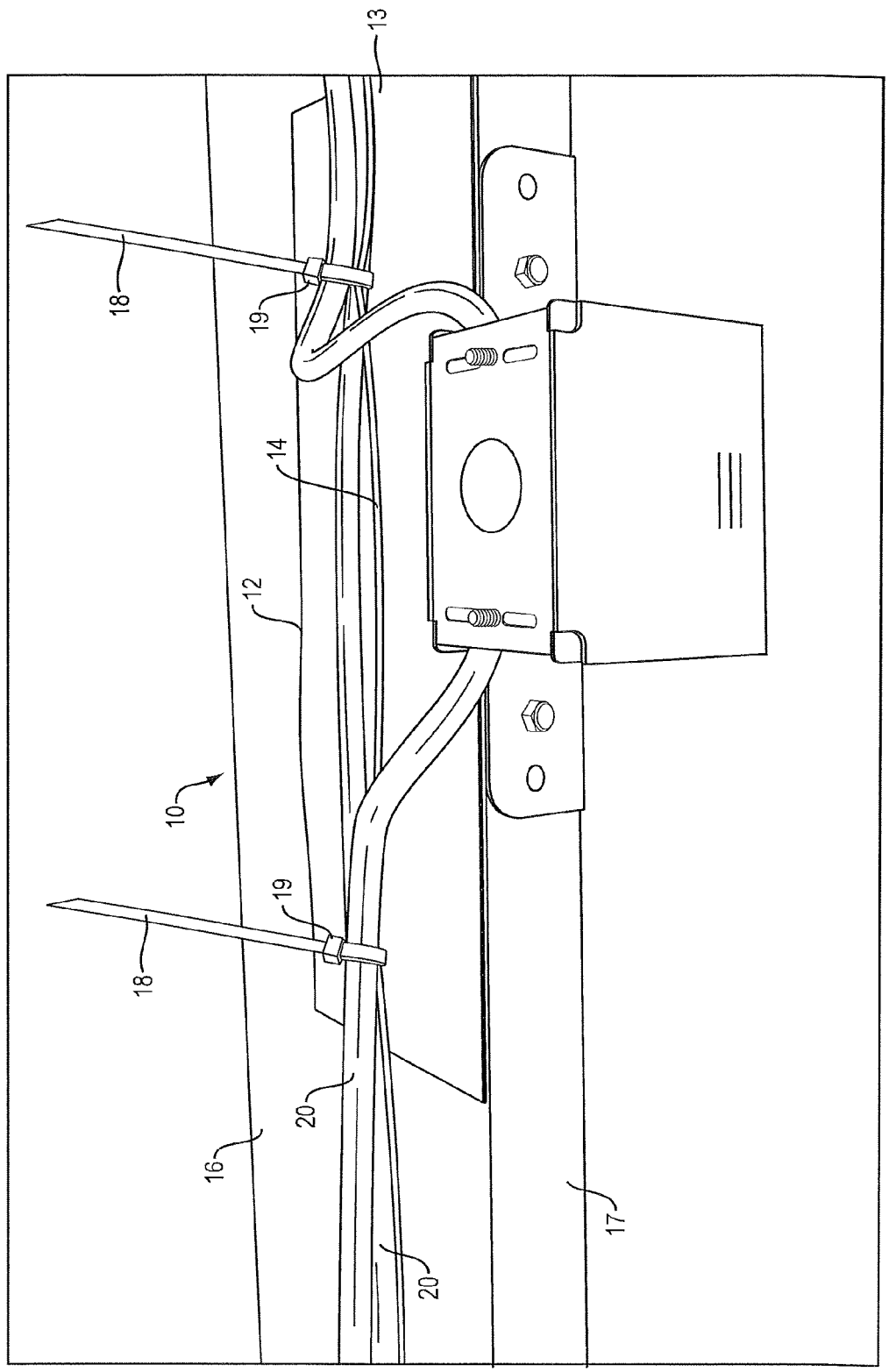
FIG. 1 is a perspective view of a first embodiment of the securing apparatus of the present invention applied to a metal stud and securing a plurality of wiring cables.
Figure 2:
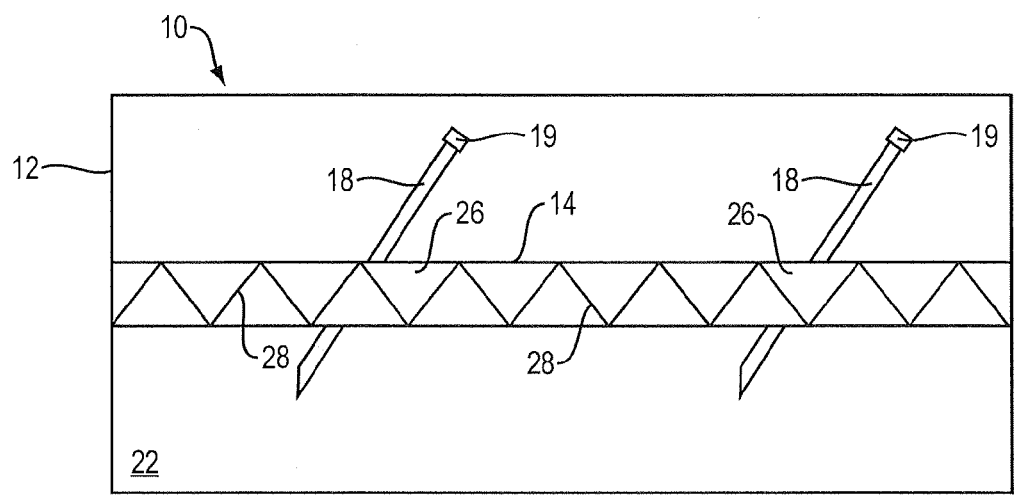
FIG. 2 is a top view of the first embodiment of the securing apparatus of the present invention.
Figure 3:
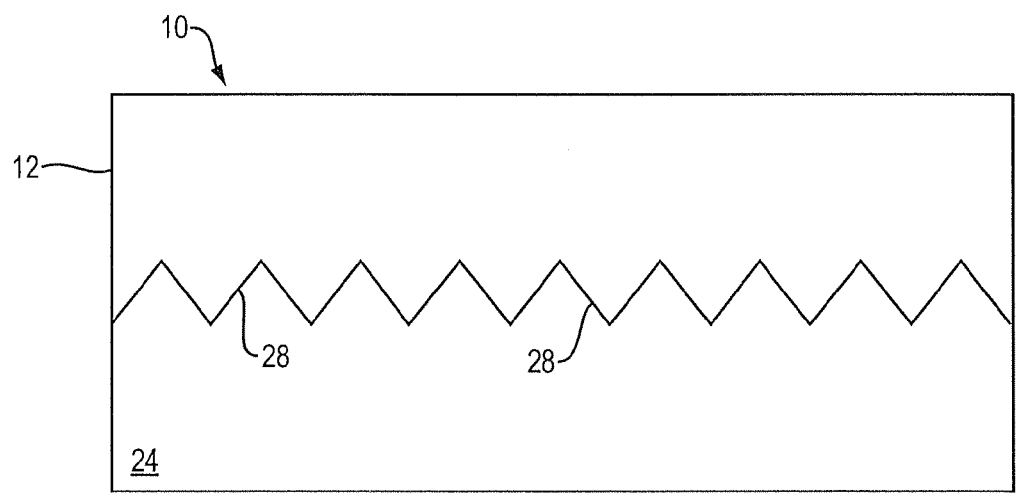
FIG. 3 is a bottom view of the first embodiment of the securing apparatus of the present invention.

A first embodiment of a securing apparatus 10 of the present invention is shown in FIGS. 1-3. The securing apparatus 10 includes a backing 12 and a retainer interface 14. The backing 12 of the securing apparatus 10 is attachable to a substrate 16, such as a building stud, and the retainer interface 14 is joined to the backing 12. The retainer interface 14 is configured to removably retain one or more retainers 18 thereto. The one or more retainers 18 are used to secure one or more wiring cables 20 to the securing apparatus 10.

The backing 12 is a film, tape, sheet or the like of material having sufficient flexibility to allow its placement on the substrate 16 where a component is to be secured. The thickness of the backing 12 may be selected as a function of the component to be secured and the location and characteristics of the substrate 16. In the embodiment of the invention shown in FIG. 1, the backing 12 is an electrical tape or film having electrical insulation characteristics. It is not limited thereto. In an embodiment of the invention, the backing 12 is a rubberized asphalt tape available from Huber Engineered Woods of Charlotte, N.C., sold under the commercial name ZIPTAPE® and available through one or more distributors. Other backing materials having sufficiently similar characteristics may be employed without deviating from the present invention.

The backing 12 is of a selectable width and length. In the embodiment of the invention shown in FIG. 1, the backing 12 is not as wide as the substrate 16 and it does not extend the entire length of the substrate 16. Optionally, the backing 12 may extend the entire length of the substrate 16. It may also be wider or narrower than is shown in FIG. 1. Further, a plurality of the securing apparatus 10 may be applied to the substrate 16, either in direct contact with one another or spaced apart from one another.

The backing 12 includes a first surface 22 and a second surface 24. The retainer interface 14 is joined to the backing 12 on the first surface 22. The first surface 22 is the surface of the backing that is visible when the securing apparatus 10 is applied to the substrate 16. An interface between the securing apparatus 10 and the substrate 16 is established at the second surface 24 of the backing 12, which second surface 24 is not visible when the securing apparatus 10 is applied to the substrate 16. The second surface 24 may include an adhesive or other affixing means to fix the backing 12 to the substrate 16. Optionally, the backing 12 may be a form of electrical tape selected from a commercial supplier to include a release paper on the second surface 24 so that the backing may be first positioned approximately where desired and then the release paper removed to expose an adhesive used to bond the backing 12 to the substrate 16. Optionally, the second surface 24 may be completely or partially covered with an adhesive, or it may have no adhesive at all and secured permanently or removably to the substrate 16 by other means.

The retainer interface 14 of the securing apparatus 10 is a fiber-reinforced film, tape or sheet having sufficient structural characteristics to enable retention of the component to be secured, such as the wiring cables 20, where it is intended to be secured without failing. That is, it should have sufficient strength so that it will not tear, rip, break or otherwise exceed its load-carrying limit. In an embodiment of the invention, the retainer interface 14 is ⅜" polypropylene machine strapping available from Pack-Edge of Portland, Me. It is to be understood that other components having sufficiently similar characteristics may be used without deviating from the present invention.

Figure 4:
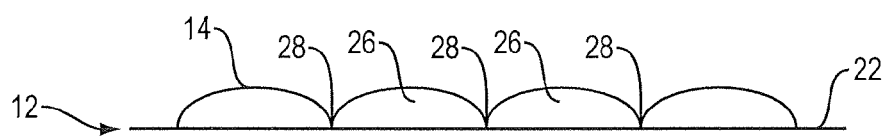
FIG. 4 is a side view of the relationship between the backing and the retainer interface of the securing apparatus of the present invention, showing partial joining and gaps between the backing and the retainer interface.
Figure 7:
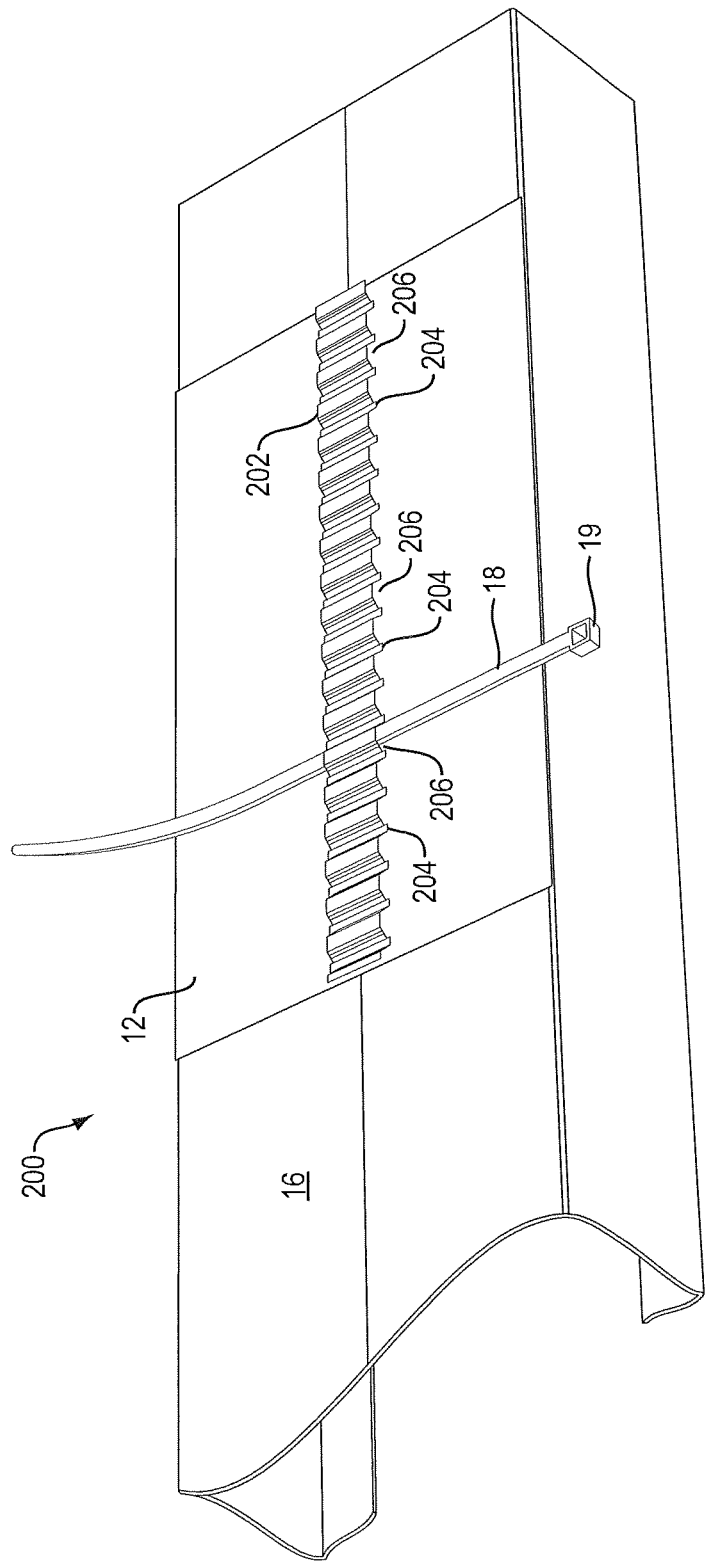
FIG. 7 is a perspective view of a third embodiment of the securing apparatus of the present invention applied to a stud.

As shown in FIG. 4, the retainer interface 14 is partially, but not completely, joined to the backing 12 with joining means. The joining means may be any sort of device or mechanism that allows for the establishment of one or more gaps 26 extending completely through from one side of the retainer interface 14 to the other. A suitable mechanism for that purpose is the application of stitching 28 that ensures the retainer interface 14 is joined to the backing 12 while also creating the gaps 26. Alternative joining means may be employed without deviating from this arrangement. For example, the retainer interface 14 may be partially bonded to the backing 12 with adhesive beads spaced from one another to establish the gaps 26. The retainer interface 14 may also be spot welded to the backing 12, provided materials suitable for that form of joining are provided for the retainer interface 14 and the backing 12. An embodiment of the invention with a welded interface is shown in FIG. 7. The joining means may also be staples, clamps, nails, screws or equivalent devices spaced from one another to establish the gaps 26. The joining means must also be of sufficient strength so as to hold the retainer 18 and to hold the retainer 18 with the component to be secured. The number of sites where the retainer interface 14 is joined to the backing 12 and the spacing of those joining sites is selectable.

The retainers 18 are selected to be of a size sufficient to allow them to pass into and through the gaps 26. Further, they are selected to have structural characteristics sufficient to ensure that they will not fail when retaining a component to be secured to the securing apparatus 10. Plastic tie wraps have been found sufficient for this purpose. They are narrow and thin enough to pass through the gaps 26 while also being strong enough to retain wiring cables 20 without failing. Tie wraps are flexible enough to be slid through the gaps 26, passed around the wiring cables 20 and a clamping end 19 of the tie wrap engaged to the body of the tie wrap to capture the wiring cables 20 therein. Other types of retainers can be employed, such as hooks, to securely retain other types of components not limited to wiring. The number and locations of the retainers 14 is selectable as a function of the particular component to be secured and access to the substrate. A convenient aspect of the use of tie wraps or other similar forms of flexible devices that can be looped and engaged is that the component to be retained may be passed through a looped retainer before the retainer is fully engaged. The component may then be positioned where desired before finally securing it.

Figure 5:
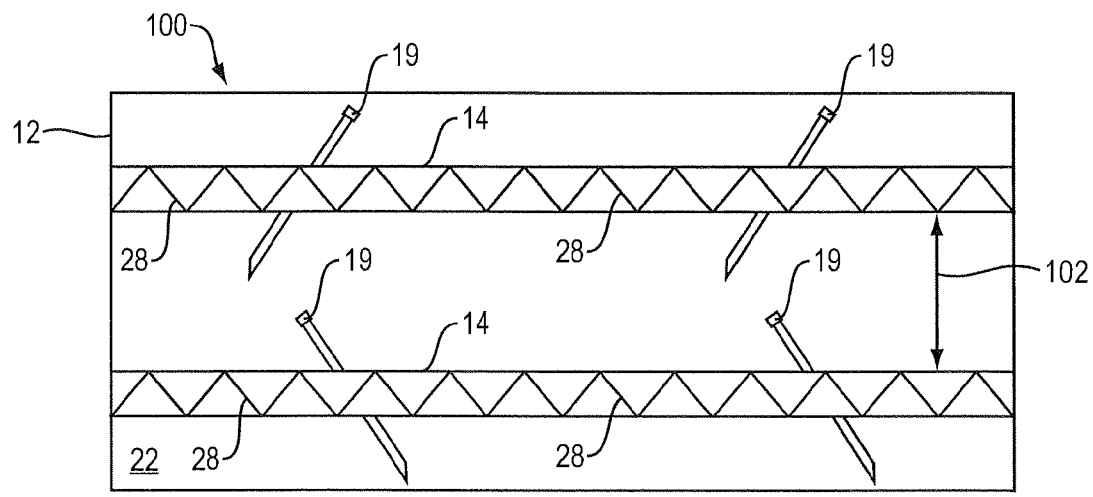
FIG. 5 is a top view of a second embodiment of the securing apparatus of the present invention.
Figure 6:
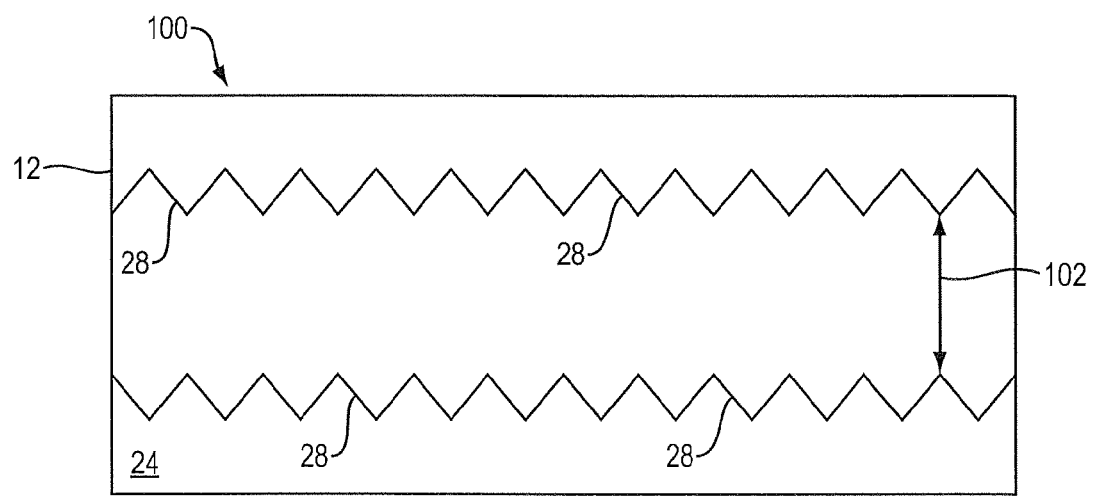
FIG. 6 is a bottom view of the second embodiment of the securing apparatus of the present invention.

A second embodiment of the present invention is shown in FIGS. 5 and 6. In this embodiment, a securing apparatus 100 includes the backing 12 and a plurality of the retainer interfaces 14. The backing 12 can be the same as the backing described with respect to FIGS. 1-4. The retainer interfaces 14 can be the same as the retainer interface 14 described with respect to FIGS. 1-4. The retainer interfaces 14 may be joined to the backing 12 in the manner described with respect to FIGS. 1-4. The securing apparatus 100 enables an installer to secure a plurality of components in parallel and spaced apart from one another by spacing 102 using a plurality of retainer interfaces 14.

A third embodiment of the present invention is shown in FIG. 7. In this embodiment, a securing apparatus 200 includes the backing 12, which may be applied to the substrate 16 in a manner described with respect to the apparatus 10. The securing apparatus 200 includes one or more of a retainer interface 202 that is joined to the backing 12 by a plurality of spot welds 204 that produce alternating gaps 206 of dimensions sufficient to enable the passage of the retainer 18 therein. The retainer interface 202 may be fabricated of a non-metallic material such as a plastic material including, for example, polyethylene, vinyl, polyvinyl chloride, PVC film and others. The spot welds 204 restrict side-to-side movement of the retainer 18 and allow an installer to place a plurality of retainers 18 on the apparatus 200. A version of the securing apparatus 200 with a plurality of retainer interfaces 202 may also be employed to enable the installer to secure a plurality of components in parallel and spaced apart from one another. The spot welding of spot welds 204 may be accomplished using techniques known to those of skill in the art of welding non-metallic materials including, for example, polyethylene, vinyl, polyvinyl chloride, PVC film and the like.

The securing apparatus 10 may be used in the following manner. First, one or more securing apparatuses 10 are applied to the substrate 16 where desired. This is accomplished by affixing the second side 24 of the backing 12 to the substrate 20 at selectable locations. When securing a component at a specified location with respect to the substrate 16, the securing apparatus 10 is specifically positioned. For example, when the component to be secured is the wiring cable 20, which must be offset from an edge 17 of the substrate 16 a particular distance, either the backing 12 may be placed where required to establish that offset, or the retainer interface 14 may be positioned with respect to an edge 13 of the backing 12 to establish that offset, and the backing edge 13 aligned with the substrate edge 17.

The second step in the use of the securing apparatus 10 of the present invention is to determine the number and location of retainers 18 to be used to secure the component 20. Third, the retainers 18 are placed in the gaps 26 of the retainer interface 14 where desired. They may or may not be at least partially engaged at that time. Fourth, when the component to be secured is the wiring cable 20, the wiring cable 20 is placed in position on the securing apparatus 10 on or close to the retainer interface 14 over the retainers 18. Alternatively, if the component to be secured does not have to be positioned on the substrate 16, the component may be coupled to the retainers 18. For example, if the component is a picture and the retainers 18 are hooks, the component does not have to be placed on the securing apparatus 10. Finally, the retainers 18 are fully engaged about the component 20 so as to secure the component 20 to the securing apparatus 10 and, thereby, the substrate 16.

The description of the use of the securing apparatus 10 above may also be applied to use of the securing apparatus 100 and to the securing apparatus 200.

The securing apparatus 10/100/200 of the present invention provides a mechanism for securing electrical wiring to building studs. More generally, it is also provides a mechanism for securing a component to a substrate. The securing apparatus 10/100/200 can be easily and quickly applied to the substrate and reliably secures the component to the substrate without concern that the component will be penetrated or otherwise damaged in a manner that could impact its functionality.

The present invention has been described with respect to a specific preferred embodiments. Nevertheless, it is to be understood that various modifications may be made without departing from the spirit and scope of the invention. All equivalents are deemed to fall within the scope of this description of the invention as set herein.

What is claimed is:

1. An apparatus for securing a component to a substrate comprising:
    a backing having a first surface and an opposing second surface, the backing having a width and a length, wherein the first surface is arranged for attachment to the substrate; and
    a retainer interface fixed to the second surface of the backing by spaced anchoring points along the length of the backing, said retainer interface between said spaced anchoring points forming a plurality of gaps between the retainer interface and the second surface of the backing, wherein a width of the retainer interface is less than the width of the backing and wherein the retainer interface extends along generally the entire length of the backing;
    one or more retainer devices,
    wherein the retainer interface is configured so that the one or more retainer devices are placed in one or more of the plurality of gaps between the retainer interface and the second surface at selectable locations along the length of the backing to enable securing of the component to the backing.

2. The apparatus of claim 1 wherein the one or more retainer devices are tie wraps.

3. The apparatus of claim 1 wherein the retainer interface is joined to the backing by stitching.

4. The apparatus of claim 1 wherein the backing is flexible.

5. The apparatus of claim 1 wherein the component is electrical wiring and the substrate is a stud.

6. The apparatus of claim 1 wherein the retainer interface is joined to the backing by welding.

7. The apparatus of claim 1 wherein the plurality of gaps between the retainer interface and the second surface of the backing are configured to be parallel and spaced apart from one another.

* * * * *